US006654779B1

(12) United States Patent
Tsuei (10) Patent No.: US 6,654,779 B1
(45) Date of Patent: Nov. 25, 2003

(54) SYSTEM AND METHOD FOR ELECTRONIC MAIL (E-MAIL) ADDRESS MANAGEMENT

(75) Inventor: Henry T. Tsuei, Omaha, NE (US)

(73) Assignee: First Data Resources, Englewood, CO (US)

( * ) Notice: Subject to any disclaimer, the term of this patent is extended or adjusted under 35 U.S.C. 154(b) by 0 days.

(21) Appl. No.: 09/291,367

(22) Filed: Apr. 14, 1999

(51) Int. Cl.[7] .................................................. G06F 9/00

(52) U.S. Cl. ........................ 709/101; 709/206; 709/100

(58) Field of Search ................................ 709/206, 100, 709/207, 101, 300; 705/41; 707/10

(56) References Cited

U.S. PATENT DOCUMENTS

| | | | |
|---|---|---|---|
| 5,632,011 A | | 5/1997 | Landfield et al. |
| 5,765,033 A | | 6/1998 | Miloslavsky |
| 5,826,269 A | * | 10/1998 | Hussey .......................... 707/10 |
| 5,961,590 A | * | 10/1999 | Mendez et al. .............. 709/206 |
| 6,282,522 B1 | * | 8/2001 | Davis et al. ................. 235/375 |
| 6,381,634 B1 | * | 4/2002 | Tello et al. .................. 709/206 |
| 6,405,243 B1 | * | 6/2002 | Nielsen ....................... 709/206 |

OTHER PUBLICATIONS

Scheussler et al., "System and method for identifying users in a distributed network", US patent application Publication US 2002/0107856 A1.*

* cited by examiner

Primary Examiner—Majid A. Banankhah
Assistant Examiner—Lilian Vo
(74) Attorney, Agent, or Firm—Morris, Manning & Martin, LLP

(57) ABSTRACT

A system and methods for managing Internet e-mail address changes, particularly useful for situations where subscribers change Internet service providers. A computer system manages a database of stored records correlating a first e-mail address of an intended recipient, e.g. an old e-mail address, to a second e-mail address, e.g. a new e-mail address of the intended recipient. A program module in the computer system is responsive to an Internet query for accessing the database to determine whether a second e-mail address of the intended recipient is stored in association with a first e-mail address. Another program module is operative for providing the second e-mail address as a response to the query. The query response is communicated to the sender or to the sender's ISP so that an undeliverable message can be resent to the new e-mail address. Also provided are security and authentication measures for ensuring that address change requests are valid and authentic.

46 Claims, 5 Drawing Sheets

TO REGISTER AND REQUEST ADDRESS CHANGE

SYSTEM AND METHOD FOR ELECTRONIC MAIL (E-MAIL) ADDRESS MANAGEMENT

TECHNICAL FIELD

The present invention relates generally to electronic mail on the Internet (also called e-mail and email), and more particularly relates to a system and methods for managing e-mail addresses to effect the delivery of e-mail messages when a subscriber abandons an e-mail address and obtains a new e-mail address, as when a subscriber changes Internet service providers ("ISPs").

BACKGROUND OF THE INVENTION

The Internet is a collection of computers, networks, routers, and gateways that use the TCP/IP suite of protocols to connect computers all over the world. The Internet links computers together in a way such that they can transfer information to each other. Computer users often subscribe to communication services provided by an Internet Service Provider ("ISP") to access and utilize the Internet.

One of the popular uses of the Internet is to send and receive electronic messages, which are often referred to as electronic mail or "e-mail." E-mail is a computer-to-computer version of interoffice mail or the postal service. E-mail enables computer users to send and receive messages over a computer network. Delivered messages are stored in electronic mailboxes that are assigned to users on the network. Messages received in a mailbox can be viewed, saved, or deleted by a recipient using known and popular electronic mail computer software such as CE Software's QUICKMAIL™, OUTLOOK™ made by Microsoft Corporation, EUDORA™ made by Qualcomm, and the like.

In order to deliver e-mail, an addressing scheme is required. Each computer on the Internet is assigned a numeric Internet protocol ("IP") address, which is a part of the TCP/IP protocol. The IP address in the current TCP/IP scheme consists of four discrete numbers, each less than 256, separated by dots (e.g., 123.4.5.678). A distinct IP address is assigned to each different computer that is connected to the Internet. Because numeric IP addresses are difficult for people to remember, the custom has arisen to utilize domain names for computers on the Internet rather than the IP numbers themselves.

Typical e-mail messages are addressed to a recipient in the form of "username@domain_name.domain," where username is a form of name for a message recipient, domain_name is a lower level domain name assigned to an organization or an ISP, and domain is a top level domain name. Present top level domain names are limited and can be the U.S. government (.gov), the U.S. military (.mil), a network (.net), a commercial enterprise (.com), an educational institution (.edu), or a country (e.g., .jp for Japan or .uk for the United Kingdom). For example, Joe Smith might subscribe to Internet service provided by a commercial enterprise or ISP called "Braincoil, Inc." and be given an e-mail address in the form of joe_smith@braincoil.com.

A computer called a domain name server ("DNS") translates between the domain_name.domain portion of an e-mail address and the numeric Internet protocol ("IP") address. When a message with an e-mail address is received at an ISP from one of its subscribers, the ISP employs a DNS to look up the numeric IP address associated with the e-mail address. Using the IP address of the message, the ISP transmits the message to an electronic device called a router, which selects one of possibly several different data communication paths connected to another computer and sends the message to the other computer. The message is passed from computer to computer, via their respective connected routers, until the message arrives at a computer associated with the ultimate intended recipient. Typically, the final computer to receive the message is a computer operated by the ISP to which the recipient subscribes. The message is then stored in a mailbox associated with the subscriber, and the subscriber is often notified via e-mail software that he or she has mail in the mailbox.

A particular problem encountered in today's usage of the Internet is the movement of subscribers from one organization to another, such as from one ISP to another. There are many reasons for subscribers to change ISPs, including a geographical move from one part of the country to another, a change to obtain a more favorable pricing plan, and a dissatisfaction with the service provided by an ISP. Changing ISPs typically means that a subscriber's e-mail address will change, unbeknownst to people who wish to send that subscriber a message. For example, Braincoil subscriber Joe Smith might have originally had an address such as joe_smith@braincoil.com. If Joe Smith moves his Internet service to a new and different ISP called "Headspiral", he might acquire a new e-mail address such as joe.smith@headspiral.com. Although it might be desirable to have a person keep his e-mail address on a permanent basis, the present scheme of addressing typically mandates that changing ISPs results in changing e-mail addresses.

People who wish to send Joe Smith a message may not know that Joe Smith has changed ISPs and thus has a new e-mail address. After a person changes ISPs, his old e-mail address at his old, former ISP becomes invalid. Messages sent to an invalid e-mail address typically "bounce" back from the intended recipient's old ISP to the sender's ISP. Stated in other words, the old ISP cannot deliver the message to the recipient, who is no longer a subscriber. In this case, the old ISP typically sends a predetermined message back to the sender's ISP that the message is undeliverable. This predetermined "bounce" message often includes a text string containing the text "message undeliverable". The predetermined bounce message is delivered to the sender to inform him or her that there is a problem with delivery of the message.

After a sender receives a bounce message, the sender may conduct a search on the Internet or may attempt to contact the intended recipient by other means (e.g., telephone) in order to obtain the intended recipient's new e-mail address. If the sender succeeds in finding the new e-mail address, he can send the message again, though a delay in delivery of the message has resulted. On the other hand, if the sender cannot find the new e-mail address, then the message cannot be delivered at all.

It would be helpful if ISPs maintained a list correlating old e-mail addresses and new e-mail addresses and updated the list when subscribers terminated their subscriptions. That way, they could provide a forwarding service. However, ISPs typically have no financial incentive to forward messages intended for former subscribers. Message forwarding requires use of computer and bandwidth resources for which ISPs will typically receive no payment. Thus, a need exists for a system and methods that facilitate delivery of e-mail when a person obtains a new e-mail address and his or her old e-mail address becomes invalid.

SUMMARY OF THE INVENTION

Briefly described, the present invention comprises a system and methods for managing e-mail address changes. The preferred system comprises a computer for managing a database of stored records correlating a first e-mail address of an intended recipient to a second e-mail address of the intended recipient. A program module in the computer system is responsive to an Internet query from a sender of an e-mail message based on the first e-mail address of the intended recipient. The program module accesses the database to determine whether a second e-mail address of the intended recipient is stored in association with the first e-mail address. Another program module in the computer system, which is responsive to a determination that a second e-mail address of the intended recipient is stored in association with the first e-mail address, retrieves the second e-mail address as a response to the query. Furthermore, a program module is provided for communicating the query response to the sender.

A principal use of the invention will be in situations wherein the first e-mail address is an invalid old address associated with a former Internet service provider (ISP) of the intended recipient, and the second e-mail address is a new e-mail address associated with a new ISP of the intended recipient.

Preferably, the computer systems utilized in implementing the present invention are Internet accessible, and the query and query response are communicated via Internet messaging protocols.

According to another aspect of the invention, a computer system automatically forwards the e-mail message to the second e-mail address in response to receipt of the query response. In one embodiment, it is a computer system associated with the sender of the e-mail message that automatically forwards the e-mail message to the second e-mail address in response to receipt of the query response. More specifically, the query response is provided to an ISP associated with the sender, and the sender's ISP autoforwards the e-mail message to the second e-mail address. Alternatively, the query response may be provided directly to the sender, and the sender's computer is operative to readdress and resend the e-mail message.

According to yet another aspect of the invention, there is provided a program module for creating a new record in the database in response to receipt of an address change request from a consumer. For security purposes, such as ensuring that address changes requests are authentic, the program module for creating a new record in the database is operative for requiring predetermined authenticating information before creating a record in the database. This authenticating information is preferably obtained from an Internet accessible authenticating authority. Various types of authenticating information may be required, such as a consumer authenticator identifying the person that requested the address change or a merchant authenticator identifying the ISP from which the address change request originated.

In embodiments of the invention that include the security features, the database stores other predetermined information in association with the first e-mail address and the second e-mail address, such other information selected from the group comprising a consumer consent, consumer authentication, and merchant authentication.

In addition to implementing the present invention with systems operative as described above, the present invention may also be embodied as computer-implemented methods for carrying out the various e-mail address management and address change operations of the invention.

Accordingly, it is an object of the present invention to provide a system and methods for managing e-mail addresses for situations where subscribers change ISPs and obtain a new e-mail address.

It is another object of the present invention to provide a system for e-mail address management that facilitates delivery of e-mail for new subscribers of an ISP by providing an address matching service between old e-mail addresses of subscribers and their new e-mail addresses.

These and other objects, features, and advantages of the present invention will become more clear upon reference to the accompanying drawings and the following detailed description.

DETAILED DESCRIPTION OF THE PREFERRED EMBODIMENT

Figure 1:
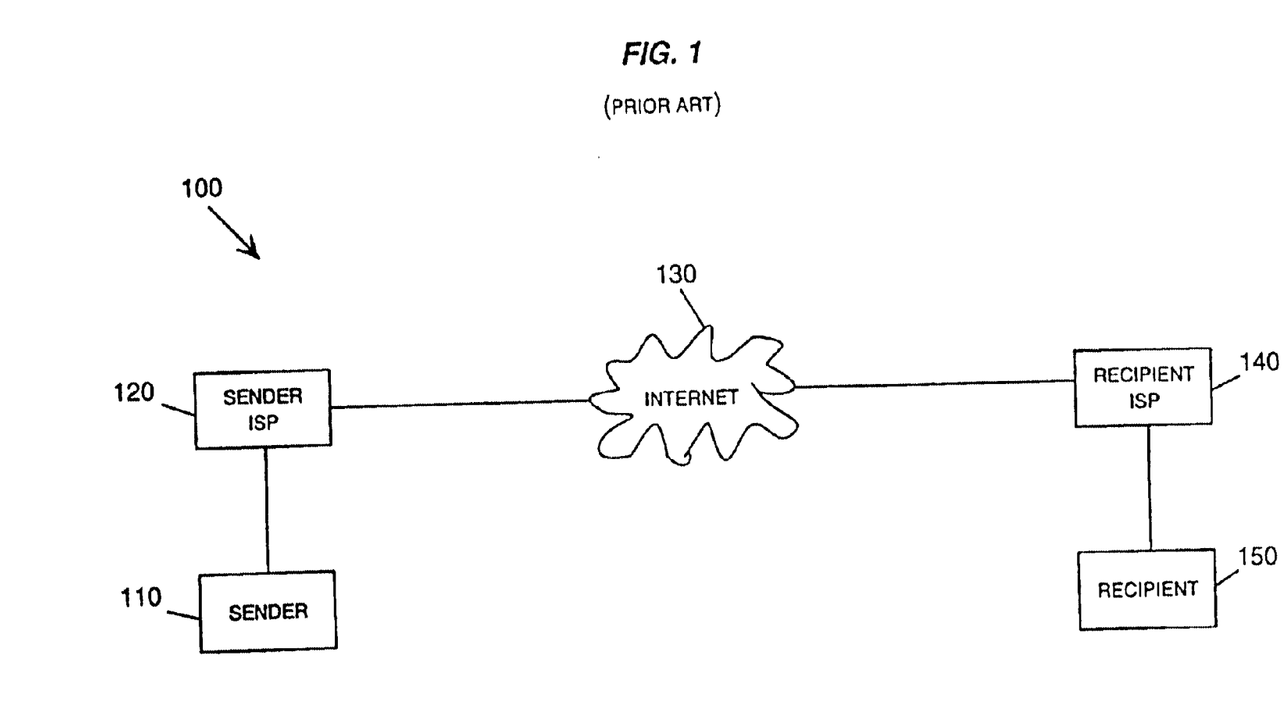
FIG. 1 is a block diagram illustrating the present known system for communicating e-mail messages from a sender to an intended recipient via the Internet.

Referring now to the drawings, in which like numerals indicate like elements and/or components throughout the several figures, FIG. 1 illustrates the present general Internet environment 100 in which electronic mail operates. A sender 110 is a person who wants to send an e-mail message to an intended recipient 150. The sender 110 subscribes to Internet service via a sender Internet service provider (ISP) 120. The sender 110 believes the intended recipient 150 is another computer user who subscribes to a recipient ISP 140. The sender ISP 120 and the recipient ISP 140 are connected for data communications through a data network such as the Internet 130, which is represented as a "cloud" to indicate its amorphous, widely distributed nature.

Figure 2:
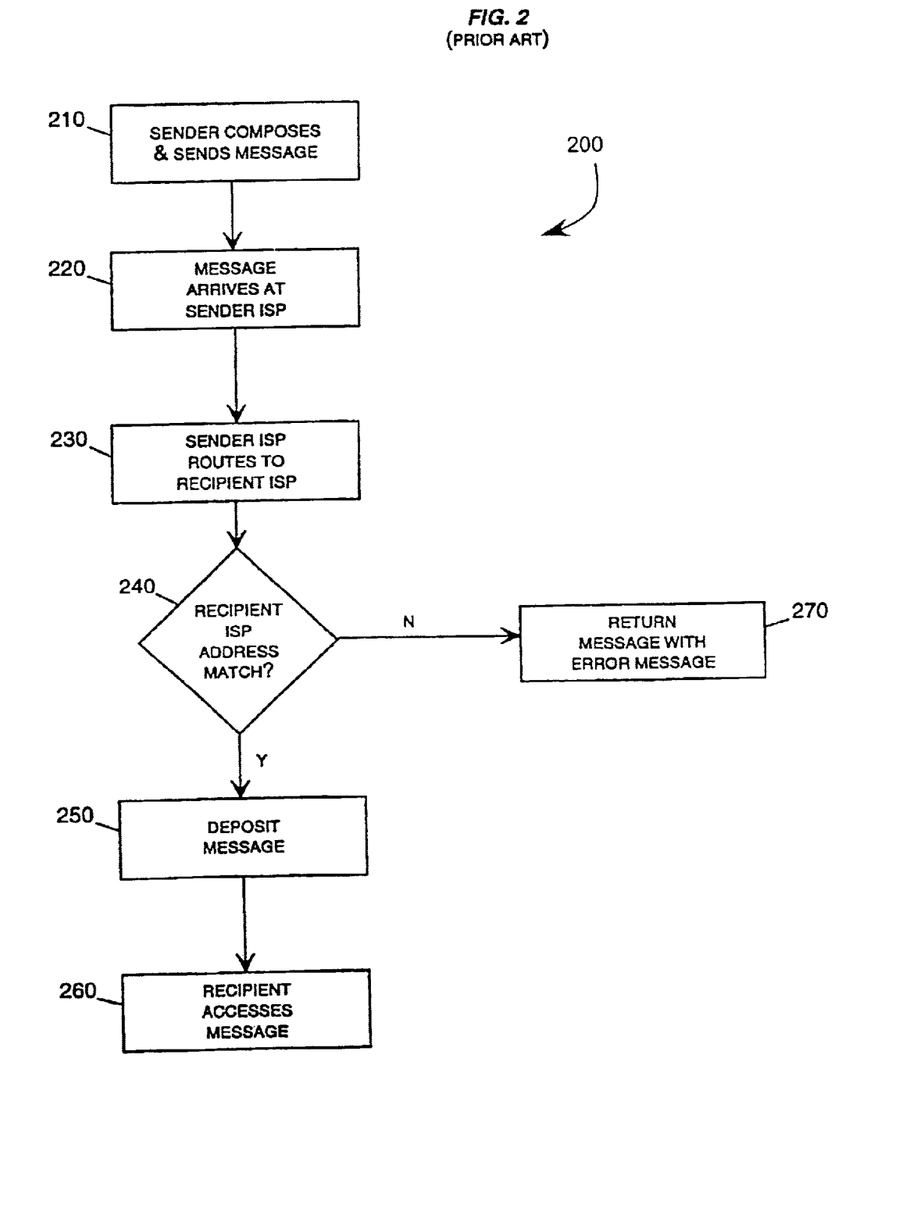
FIG. 2 is a flow chart illustrating the known process by which present day e-mail systems handle e-mail delivery and error messages in the event of failed delivery.

FIG. 2 illustrates the known prior art process 200 that is followed when an e-mail message is sent from a first user at one ISP (the sender 110) to an intended recipient. Starting at step 210, the sender 110 composes an e-mail message. He then addresses that e-mail with an address he believes to be the correct one for the intended recipient. As described above, an e-mail address is formatted to comprise two pieces of information: 1) recipient's username (which corresponds to the mailbox the sender believes the intended recipient has at an ISP), and 2) the domain name and domain associated with the recipient ISP 140. After composing and addressing the message, the sender 110 then sends the message from his computer utilizing known e-mail computer software.

After the sender 110 sends the message, step 220 is performed. In step 220, the message arrives at the sender ISP 120. Next, in step 230, the sender ISP 120 routes the message to the recipient ISP 140 using the address that was provided with the message. The sender ISP 120 typically does this by employing a domain name server (DNS) to translate the address provided with the message into a numeric IP address. Using the IP address, the sender ISP 120 sends the message over the Internet through the proper mail gateway (not shown). After traveling over the Internet 130, the message arrives at the recipient ISP 140.

Next at step 240, the recipient ISP 140 determines whether there is an address match. That is, the recipient ISP 140 determines if the mailbox specified in the username portion of the e-mail address exists at that ISP. This step is effected by reference to a stored list of valid addresses associated with the recipient ISP.

If there is an address match, the recipient ISP 140 deposits the message in the mail box of the recipient 150 at step 250. Once a message has been deposited in the recipient's mailbox, the recipient can access that message in step 260 through a computer connected to the recipient ISP 140.

If, at step 240, there is no address match for the e-mail message at the recipient ISP 140, then step 270 is performed. At step 270, the recipient ISP 140 returns the message to the sender in the known manner along with an error message (also called a "bounce" message) because the intended recipient does not have the mailbox specified in the address at the recipient ISP. The recipient ISP 140 returns the message by sending it back over the Internet 130 to the sender ISP 120. In turn, the sender ISP transmits the error message to the mailbox of the sender 110. As previously described, a typical error message contains the text string "message undeliverable." Although most present day e-mail systems typically include this "message undeliverable" text string, those skilled in the art will appreciate that other mechanisms or text strings can exist or be created to indicate the fact that an e-mail message cannot be delivered to a particular mailbox, and that such other mechanisms or text strings may serve as an indication that a "message" is "undeliverable" within the scope of the present invention.

Now that the known e-mail process 200 has been described, one can better appreciate what events may lead a message to be returned to a sender because the message could not be delivered to the intended recipient. In particular, one common situation merits special mention.

Suppose the intended recipient was at one time connected to the Internet through an ISP called Old ISP. While the recipient had a mailbox at Old ISP, he distributed his e-mail address to many others, including sender. At a later time, suppose that the intended recipient changed ISPs from Old ISP to a different ISP called New ISP. In doing so, the intended recipient's mailbox at Old ISP was removed, and he got a new mailbox at New ISP. Along with the mailbox change, of course, came an address change from an old e-mail address to a new address. However, the intended recipient's old address was so widely distributed that he may have been unable to inform every friend and acquaintance of his new address. Further suppose that the sender was one of those people that the intended recipient failed to inform of the new address.

Now, suppose that the sender wants to send a message to the intended recipient. Not having been informed otherwise, the sender assumes that the intended recipient can still receive e-mail at the old address. When the sender sends a message to the intended recipient at the old address, it is returned to him with an error message because Old ISP is unable to find an address match.

If, at that point, the sender still wants the intended recipient to receive the message, he will first have to conduct a search to find the intended recipient's new address. If the sender succeeds in finding the intended recipient's new e-mail address, he must then once again send the message, this time to the new address.

Clearly, the described problem inconveniences both senders and intended recipients. It also poses a burden to any ISP attempting to win over customers from other ISPs. Many people have a natural resistance to change; once an e-mail address has been widely disseminated, there is a disincentive to obtain a new address because of the inconvenience of notifying a large number of people of the new address. Therefore, there is a need in the art to reduce the inconveniences caused by users changing ISPs and/or addresses.

The present invention makes the process of sending e-mail function more smoothly through a system and methods for managing e-mail addresses, especially e-mail addresses that have changed. In this manner, the present invention allows reduction of the inconveniences caused by a user changing his or her ISP or address.

Figure 3:
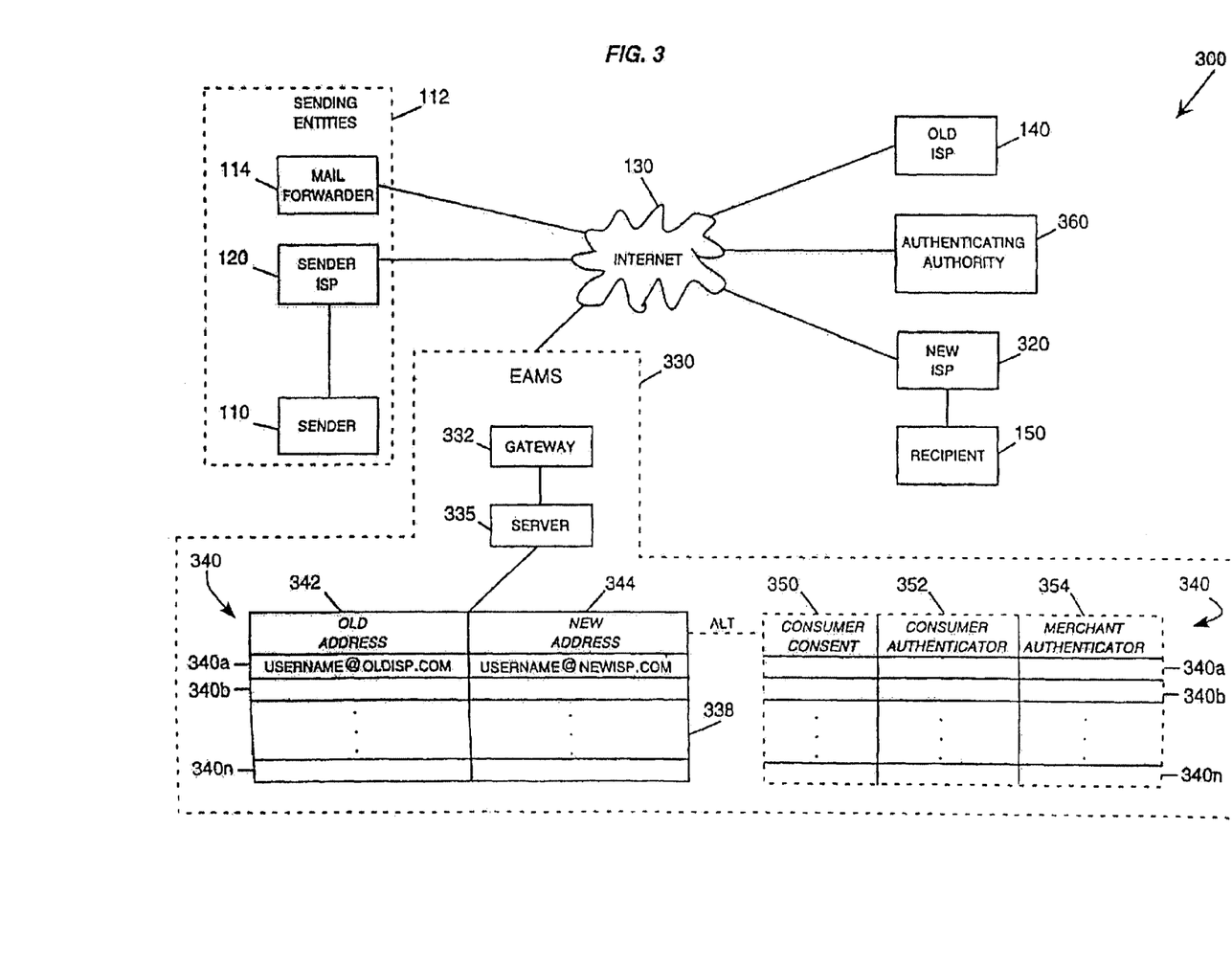
FIG. 3 is a block diagram illustrating an Internet-based system for communicating e-mail messages from a sender to an intended recipient constructed in accordance with the present invention.

Referring next to FIG. 3, a general Internet architecture 300 that includes an E-mail Address Management System ("EAMS") 330 constructed in accordance with the preferred embodiment of the present invention is shown and will be described. The preferred EAMS 330 is a computer-implemented database system comprising a gateway 332, a computer server 335, and a memory or database 338 constructed as a database look-up table that correlates an old e-mail address to a new e-mail address for each participant. For example, the recipient 150 at one time was a user of Old ISP 140 and had an old mailbox at Old ISP with an old address. At a later time, the recipient 150 changed ISPs to New ISP 320 and obtained a new mailbox at New ISP with a new address.

In the preferred system, the recipient 150 registers his or her address change with the EAMS 330 in order to have information about the address change in the database 338. The registration process is discussed in more detail later. As described above, the preferred EAMS 330 contains an old address and a new address for each address change registered with the EAMS 330 and stored in the database 338. Preferably, this address change information is stored in the form of a data record 340 having a plurality of data fields, including an old e-mail address field 342 and a new e-mail address field 344. The fields of a plurality of these records may be indexed for searching or otherwise stored so that they can be retrieved in accordance with known database techniques.

The EAMS 330 is connected to the Internet 130 and thus is accessible by any ISP that is connected to the Internet and can send and receive e-mail messages. Other types of communications between the EAMS 330 and ISPs are possible and contemplated in the present invention, such as file transfer protocol (ftp) messaging, hypertext transfer protocol (http) messaging, and customized messaging using the TCP/IP protocol. However, the known Internet e-mail messaging protocol is preferred for its simplicity and wide acceptability.

Also shown in FIG. 3 is an authenticating authority 360 connected to the Internet 130. The authenticating authority 360 is one of several known types of systems. that provide computer-based authentications, such as a certificate authority. One example of a known authenticating authority is the Cybertrust, operated by GTE. An authenticating authority 360 may be involved in the present invention in embodiments wherein the EAMS 330 , for security and fraud prevention purposes, requires certain authenticating information from subscribers before accepting data that correlates a new e-mail address to an old e-mail address.

According to another aspect of the invention, described in more detail below, the database 338 also stores predetermined information associated with an old e-mail address and new e-mail address. By way of example but not limitation, this information may include consumer consent information, consumer authenticator information, and merchant authenticator information and may be stored in separate but associated fields 350, 352, and 354, respectively, of the record 340. Such additional fields are preferably provided for purposes of security, troubleshooting, and dispute handling.

Generally, the EAMS 330 is operative to receive from any source queries in the form of predetermined messages containing an e-mail address. In response to receiving a query, the EAMS 330 can look up the e-mail address in the database 338 in order to determine if the e-mail address is associated with a new e-mail address. In one embodiment of the present invention, the query to the EAMS 330 may include a message that the EAMS 330 automatically forwards ("autoforwards") to the new address if a new address is found.

Alternatively, the EAMS 330 is not operative to automatically forward a message even if a new address is found after searching the database 338. Instead, if the database 338 correlates a new address with the address sent in the query, the EAMS 330 informs the entity which sent the query about the new address. On the other hand, if the database 338 does not have a new e-mail address associated with the address sent in the query, the EAMS 330 informs the entity which sent the query of this fact. Various embodiments of the present invention are possible in which different entities query the EAMS 330. A few of these exemplary embodiments are now discussed in more detail.

In the preferred embodiment of the present invention, the sender ISP 120 is configured to autoforward e-mail containing an old address to a new address. If a message is sent to an intended recipient at the old address, the message is returned to the sender ISP 120 with an error message, since there is no address match at Old ISP 140. At that point, the sender ISP 120 queries the EAMS 330 over the Internet 130 to find out if there is an address change registered with the EAMS for the old address. Then, the EAMS 330 searches its database to see if it contains a record relating the old address to a new address. If a new address is found for the old address, then the EAMS 330 sends the new address back to the sender ISP 120. With the new address, the sender ISP 120 automatically forwards the message to the intended recipient 150 at the new ISP 320 and notifies the sender 110 via e-mail of the intended recipient's new address. If the EAMS 330 does not find a record relating an old address to a new address, then the EAMS 330 preferably notifies the sender ISP 120 of this fact. In this case, the sender ISP 120 then notifies the sender 110 via e-mail that the message could not be delivered to old address and that there was no forwarding address registered with the EAMS 330.

In another embodiment of the invention, a sender 110 who Dreceives a bounce message can himself or herself query the EAMS 330 over the Internet 130 to determine if the intended recipient 150 has registered an address change with the EAMS 330. In such an embodiment, the query may be conducted via e-mail. Alternatively, the EAMS 330 may have a web site interface (i.e., an http interface) that allows a sender 110 to input an e-mail address and determine if that e-mail address is correlated with a new e-mail address. This aspect of the invention is useful where the ISP of the sender 110 is not configured to automatically query the EAMS 330 to obtain a new e-mail address in response to receipt of a bounce message. In this situation, the sender 110 who finds a new address after making a query of the EAMS 330 can then use the new address to resend the message that caused the bounce message in the first place. The sender 110 may also want to query the EAMS 330 about an address change if the sender suspects, even before sending an e-mail, that the intended recipient 150 has changed addresses.

In yet another embodiment of the present invention, a sender may be provided with forwarding software that is stored on the sender's computer. The forwarding software is responsive to receipt of a bounce message indicating that a message previously sent by the sender could not be delivered (i.e., the software is automatically responsive to the text string "message undeliverable" contained in an e-mail message). Upon receiving such a bounce message, the forwarding software can initiate a query to the EAMS 330 to determine if the EAMS 330 has a record associating a new e-mail address with the e-mail address of the message that could not be delivered. The EAMS 330 then notifies the forwarding software preferably via e-mail, of the results of the query, and the EAMS 330 includes the new address if one is found. Upon notification that there exists a new address, the forwarding software automatically forwards the message that previously could not be delivered to the new address.

In FIG. 3, a mail forwarder 114 is also shown connected to the Internet 130. A mail forwarder 114 is capable of receiving an e-mail message at a given e-mail address over the Internet. After receiving the e-mail message, the mail forwarder 114 then sends the message back out onto the Internet to another Internet address. The address to which the e-mail message is forwarded may be determined by software used to operate the mail forwarder 114, or alternatively the mail forwarder may look to the contents of the e-mail itself for instructions on where to send the e-mail.

The mail forwarder 114, the sender ISP 120, and the sender 110 are all sending entities 112 that are capable of sending and receiving e-mail messages. One skilled in the art should recognize that various embodiments of the present invention are possible in which any one of the sending entities attempts to send an e-mail message using a first address, receives a "message undeliverable" error, queries the EAMS 330 based on the first address, receives a second address over the Internet from the EAMS 330 in response to the query, and then resends the e-mail message using the second address.

Figure 4:
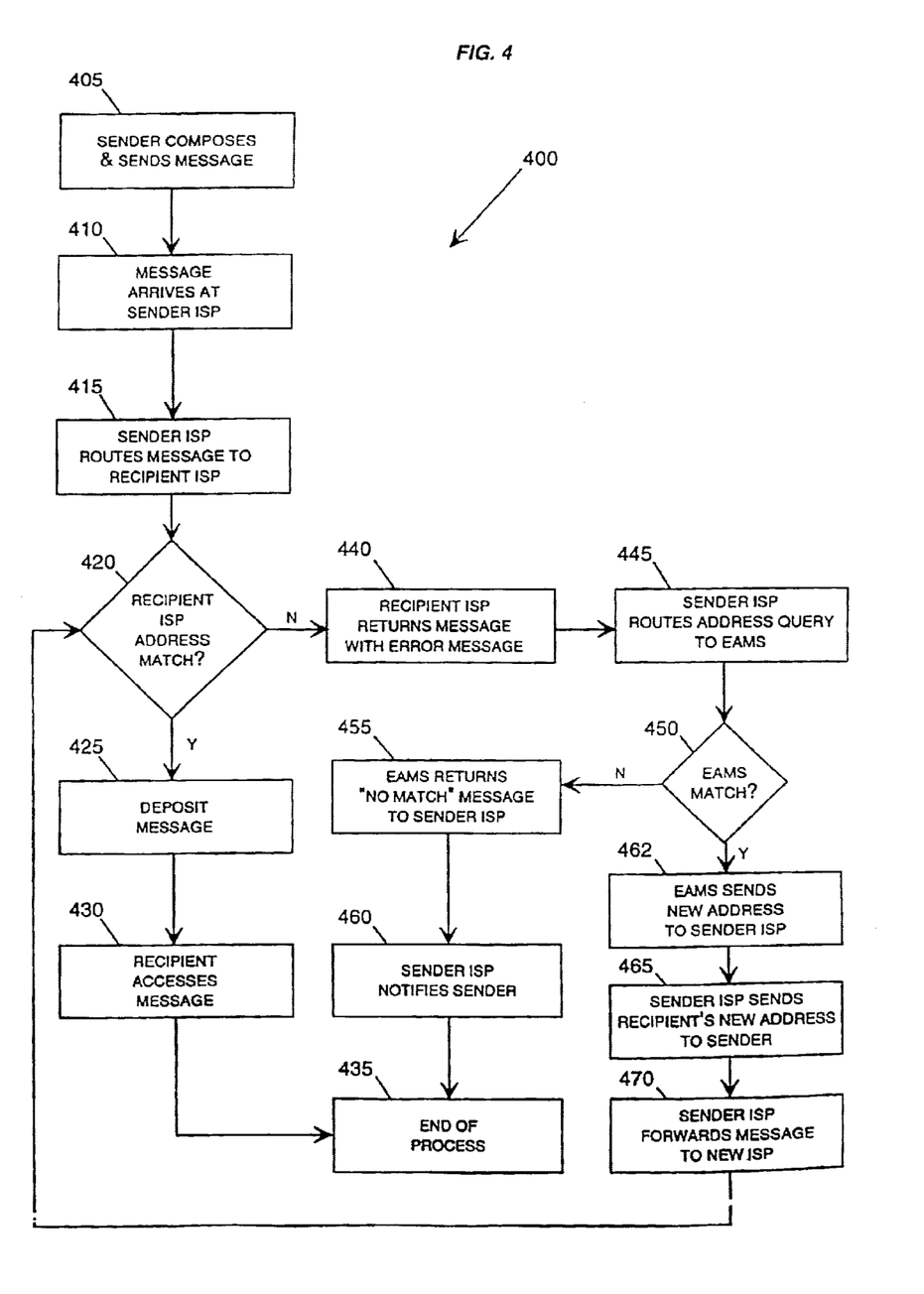
FIG. 4 is a flow chart illustrating the process carried out by the preferred system of FIG. 3.

FIG. 4 is a flowchart illustrating a computer-implemented process or method 400 for sending an e-mail in accordance with the preferred embodiment of the present invention. The described process assumes that a sender ISP is configured to access an EAMS 330 over the Internet in the event that a message is returned to it which is undeliverable.

The method 400 is preferably implemented as one or more computer application programs, operative to run on a computer apparatus comprising a central processing unit, main memory, permanent read/write memory (hard disk, floppy disk, etc.), display, keyboard, and mouse. Such elements of a computer apparatus are known to those skilled in the art and will not be described further herein. It will further be appreciated that the steps of FIG. 4 are carried out in several different computer devices connected, for example, via the Internet. These computer devices comprise a computer system associated with the message sender, a computer system associated with the message sender's ISP, a computer system associated with the intended recipient's old ISP, a computer system associated with the intended recipient's new ISP, and a computer system associated with an EAMS 330 constructed and operative as described herein. The discussion which follows will enable one skilled to the art to understand which portions or parts of the process 400 are applicable to and carried out in which computer system.

Starting in FIG. 4 at step 405, a sender composes a message at his or her computer and addresses it to the address believed to be correct for an intended recipient. The sender then sends the message from his computer to a computer system that provides Internet access, which is typically the ISP at which the sender maintains an Internet service subscription. An example of the ISP to which the sender may send his message is the sender ISP 120 of FIG. 3. It will, however, be appreciated that a message need not be sent to a specific ISP at which the sender maintains a subscription; rather, in accordance with the invention, the message may be sent to any computer system that provides Internet access, which for purposes of this description serves as the "sender ISP".

At step 410, the message arrives at the sender ISP. At step 415, the sender ISP chooses a particular mail gateway in accordance with the IP address of the message and routes the message to the ISP indicated in the message address as the recipient ISP. The message is then sent over the Internet and arrives at the recipient ISP, which is the old ISP 140 in FIG. 3.

At step 420, the recipient ISP determines whether there is an address match, i.e., whether the mailbox specified in the address of the received message presently exists at recipient ISP. This is carried out in the known manner by reference to an address table stored at the recipient ISP that correlates subscribers of that ISP and their associated e-mail addresses.

If the recipient ISP finds an address match at step 420, then step 425 is performed. At step 425, the recipient ISP deposits the message in the mailbox specified in the address. At step 430, the intended recipient accesses the message from his mailbox using a computer connected to the recipient ISP. After the intended recipient accesses the message in his mailbox, the process ends at step 435.

It will be appreciated that the situation of the foregoing steps is identical to that of FIG. 1 and the accompanying text where the intended recipient has a mailbox at the address to which the sender 110 sends the message. If this is the case, it will of course be appreciated that the EAMS 330 does not enter into play. On the other hand, if, at step 420, there is no match between the e-mail address of the message received at the recipient ISP and the list of valid addresses at the recipient ISP, the "no" branch is followed to step 440 and the method of the present invention comes into play.

At step 440, the recipient ISP returns the message to the sender ISP over the Internet with an error or bounce message, as previously described. Control then passes to step 445.

At step 445, the sender ISP receives the error message and sends an address query to the EAMS 330 over the Internet to determine if there is an address change registered with the EAMS 330 for the address indicated in the returned message. The address query comprises the address for which a new address is sought.

After the EAMS 330 receives the address query, step 450 is performed. In step 450, the EAMS 330 searches its database, i.e. database 338 FIG. 3, to see if it contains a record relating a new address to the address contained in the address query. If a new address is found for the address of the address query, then there is an EAMS match.

If there is no EAMS match, control passes to step 455. There are several reasons for no EAMS match. For example, the reason could be because the intended recipient never had the mailbox specified in the address at the recipient ISP specified in the address. Or, there might be no EAMS match because the intended recipient changed addresses but failed to register the address change with the EAMS 330. In step 455, the EAMS 330 notifies the sender ISP that there was no EAMS match.

At step 460, the sender ISP notifies the sender, typically via e-mail, that the message could not be delivered to the address provided for the message and that there was no address change registered with the EAMS 330 for that address. After step 460, the process ends at step 435.

It will of course be appreciated that there will be an EAMS match found at step 450 in the event that the intended recipient has registered his or her address change with the EAMS 330. A match will also be found at step 450 in the event that the EAMS 330 for some other reason contains a record matching the old e-mail address to a new e-mail address. For example, the present invention contemplates the situation where ISPs transmit address changes to the EAMS 330. The present invention also contemplates the situation where some other third party provides the EAMS 330 with a list correlating particular e-mail addresses to other e-mail addresses.

Returning to step 450, if there is an EAMS match for the address provided in the address query from the sender ISP, then control passes to step 462, in which the EAMS 330 sends the new address over the Internet back to the sender ISP. Once the sender ISP receives the new address, the sender ISP notifies the sender via e-mail of the intended recipient's new address in step 465.

In step 470, the sender ISP forwards the message to the intended recipient's new ISP using the new address. After the new ISP receives the message, control passes to step 420, with the new ISP now serving as the recipient ISP. The message is then delivered to the intended recipient in accordance with the steps subsequent to 420.

Figure 5:
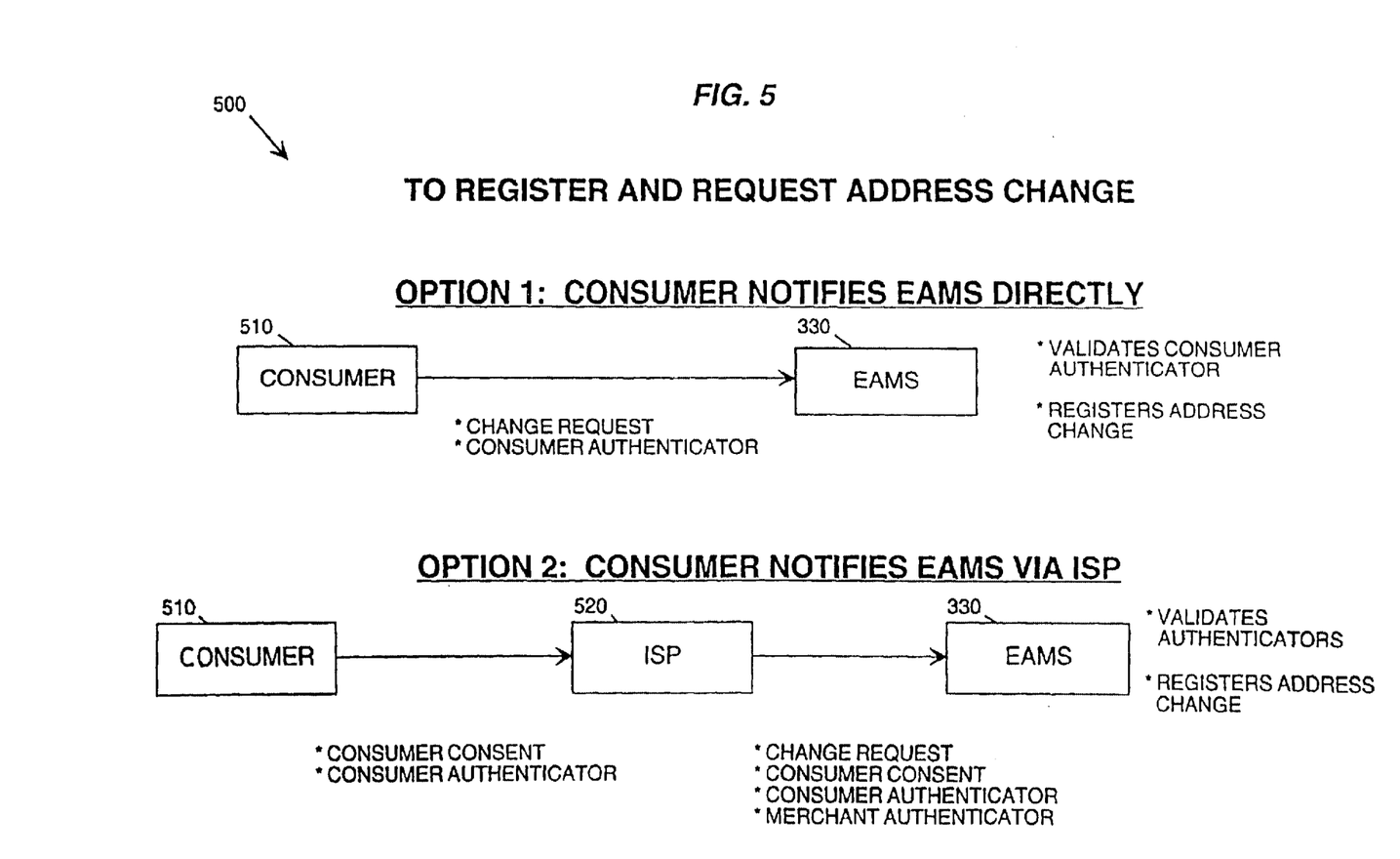
FIG. 5 illustrates the process by which a person registers an address change and authentication steps for use in the preferred system of FIG. 3.

FIG. 5 illustrates a registration process 500 in which persons with e-mail addresses or mailboxes ("consumers") provide information to the disclosed EAMS 330 for the purpose of maintaining the cross reference table or database 338 of FIG. 3. Typically, the present invention contemplates creation of a new record in the database in response to receipt of an address change request from a consumer. It will be appreciated that there are several ways in which a consumer may provide the requisite information of an e-mail address change to the EAMS 330.

One way to register an address change is for a consumer 510 to register an address change with the EAMS 330 directly in the form of an address change request. In this case, the consumer 510 provides the EAMS 330 with an address change request comprising predetermined information indicating the identity of the consumer and the e-mail address change. For security purposes and for ensuring that an address change is valid, the EAMS 330 may require certain additional information from the consumer before creating a record correlating the given new e-mail address to an old address. This additional information may include the consumer's social security number, mother's maiden name, employer's ID number, and similar information.

In such an embodiment, however, it will be appreciated that security is not as great as may be desired, and greater assurance of the validity of an address change may be preferred. Therefore, preferred embodiments of the invention will employ devices or methods for increasing assurance of a valid change. Those skilled in the art will understand and appreciate that there are presently several known methods for authenticating a person's identity and authority in the Internet environment. For example, an authenticating authority, such as the authenticating authority 360 in FIG. 3, is preferably employed to provide such greater assurance of a valid address change.

In accordance with the preferred embodiments of the invention, the EAMS 330 requires predetermined authentication information prior to effecting an address change. This is to minirize the possibility that an unauthorized person can successfully divert e-mail from a known e-mail address to another address for unlawful purposes such as e-mail interception or as a malicious prank. Preferably, therefore, any registration with the EAMS 330 will include (1) an address change request and (2) a consumer authenticator. The address change request typically includes the consumer 510's old e-mail address and new e-mail address, as well as other optional information.

The consumer authenticator simply ensures that the consumer 510 is who he says he is. The consumer 510 can obtain a consumer authenticator by registering with any one of a number of known authentication authorities, such as the authentication authority 360 in FIG. 3, that are approved by the entity running the EAMS 330. The address change registration and the registration with the authentication authority may, but need not, be transacted electronically over the Internet 130.

Once the EAMS 330 receives the address change request and consumer authenticator, it first validates the consumer authenticator. This is typically effected by contacting the authenticating authority in the known manner. After validation, the EAMS 330 creates a record in its database 338 so that it can provide the new address in response to an address query on the old address.

Alternatively, and still referring to FIG. 5, there is a second way to register an address change. In this second option, the consumer 510 who has obtained a new e-mail address with an ISP 520 first provides the ISP 520 with predetermined information comprising (1) a consumer consent and (2) a consumer authenticator. The consumer consent ensures that the consumer 510 wants his or her address change registered with the EAMS 330 . The consumer authenticator is the same as that used in the first registration option and can be obtained as already explained.

Once the ISP 520 has both the consumer consent and the consumer authenticator, the ISP preferably submits certain predetermined information, typically via e-mail or other Internet communication, to the EAMS 330 . This predetermined information preferably comprises (1) a change request, (2) the consumer consent, (3) the consumer authenticator, and (4) a merchant authenticator. Although all of this information is not required in all embodiments, certain combinations of this information are preferred for use in the present invention to provide for adequate assurances of security and privacy for the ISP's customers.

Typically, the change request will include as minimum required information the old e-mail address and the new e-mail address of the consumer 510. Furthermore, it is also contemplated that the ISP 520 may retain the consumer authenticator and provide the merchant authenticator in embodiments where the EAMS 330 only requires provision of the merchant authenticator. This configuration may be more attractive in certain situations, such as when the ISP 520 is configured to store consumer consents and authenticators and the EAMS 330 is configured to store merchant authenticators.

The merchant authenticator comprises predetermined information that ensures that the ISP 520 is a legitimate ISP and is reauthorized and/or recognized by the EAMS 330 as an entity from whom the EAMS 330 accepts address changes. In accordance with an aspect of the invention, the EAMS 330 can refuse to accept address change requests from ISPs that are known to be "outlaw" or have developed a history of customer problems or unauthorized address changes. As in the case of consumer authentication, ISPs can obtain a merchant authenticator by registering with any one of a number known authentication authorities approved and/or recognized by the entity running the EAMS 330. All registrations may, but need not, be transacted electronically over the Internet 130.

Once the EAMS 330 receives the required predetermined information, e.g. change request, consumer consent, consumer authenticator, and merchant authenticator, it first validates both the consumer authenticator and the merchant authenticator. This is carried out in the known manner by reference to the applicable authorities that issued the authenticators. After validation, the EAMS 330 creates a record in its database 338 containing the old e-mail address in association with the new e-mail address so that it can provide the new address in response to an address query on the old address. In addition, according to another aspect of the invention, information corresponding to the change request, consumer consent, consumer authenticator, and merchant authenticator are stored in the database 338 so that such information can be retrieved and referenced in the event of a later difficulty or dispute.

Now that the address change registration process has been explained, another embodiment of the present invention is discussed. Those skilled in the art will recognize that when an old ISP 140 receives a message that it cannot deliver because there is no address match, it is possible for the old ISP to send an address query on the address to the EAMS 330 instead of immediately sending the message back to the sender ISP 120 with an error message and letting the sender ISP conduct the address query. Once the old ISP 140 receives the results of the address query, the old ISP can act on the results just as the sender ISP 120 would have acted had the sender ISP conducted the address query. It will therefore be appreciated that the present invention is not limited to a situation in which the sender's ISP queries the EAMS 330 with the old address. Rather, the invention is operative in any situation where an Internet entity becomes aware of the inability to deliver an e-mail message due to such circumstances as an address being invalid, outdated, or changed.

Other alternative embodiments of the present invention will become apparent to those skilled in the art without departing from its spirit and scope. The preferred embodiment of the present invention has been disclosed by way of example and it will be understood that other modifications may occur to those skilled in the art without departing from the scope and the spirit of the appended claims.

What is claimed is:

1. A method for effecting delivery of an e-mail message from a sender to an intended recipient, the sender having an Internet service provider (ISP) operative to transmit e-mail messages, the intended recipient associated with an undeliverable first e-mail address associated with a first Internet service provider (ISP) and currently associated with a second e-mail address associated with a second Internet service provider (ISP), comprising the computer implemented steps of:

providing a database of stored records correlating the first e-mail address of the intended recipient to the second e-mail address of the intended recipient;

in response to receipt at the sender's ISP of a "message undeliverable" message from the first ISP in response to the e-mail message being undeliverable to the first e-mail address, communicating a query from the sender's ISP to the database, the query including the undeliverable first e-mail address;

receiving at the database the query from the sender's ISP;

in response to the query, accessing the database to determine whether the second e-mail address of the intended recipient is correlated with the first e-mail address;

in response to a determination that the second e-mail address of the intended recipient is correlated with the first e-mail address, retrieving the second e-mail address as a response to the query and generating a query response including the second e-mail address;

communicating the query response to the sender's ISP;

at the sender's ISP, utilizing the second e-mail address received in the query response as the address for the e-mail message; and automatically transmitting the e-mail message from the sender's ISP to the second ISP associated with the second e-mail address without the sender's involvement.

2. The method of claim 1, wherein the first e-mail address is an invalid old address associated with a former Internet service provider (ISP) of the intended recipient and the second e-mail address is a new e-mail address associated with a new ISP of the intended recipient.

3. The method of claim 1, wherein the database is stored in an Internet accessible electronic mail address management system (EAMS), and the query and query response are communicated via Internet messaging protocols.

4. The method of claim 1, wherein a computer system associated with the database automatically forwards the e-mail message to the second e-mail address in response to the query response.

5. The method of claim 1, further comprising steps for creating a new record in the database in response to receipt of an address change request from a consumer having an e-mail box.

6. The method of claim 5, further comprising the step of requiring predetermined authenticating information before creating the new record in the database.

7. The method of claim 6, wherein the authenticating information is obtained from an Internet accessible authenticating authority.

8. The method of claim 6, wherein the authenticating information comprises a consumer authenticator.

9. The method of claim 6, wherein the authenticating information comprises a merchant authenticator.

10. The method of claim 1, wherein the database stores other predetermined information in association with the first e-mail address and the second e-mail address, such other information selected from the group comprising a consumer consent, consumer authentication, and merchant authentication.

11. A system for managing e-mail address changes, comprising:

a computer system;

a database of stored records in the computer system correlating a first e-mail address of an intended recipient to a second e-mail address of the intended recipient;

a program module in the computer system responsive to a query from a sender's Internet service provider (ISP) associated with a sender of an e-mail message based on the first e-mail address of the intended recipient for accessing the database to determine whether the second e-mail address of the intended recipient is stored in association with the first e-mail address;

a program module in the computer system, responsive to a determination that the second e-mail address of the intended recipient is stored in association with the first e-mail address, for retrieving the second e-mail address as a response to the query; and a program module in the computer system for communicating the query response to a process for utilization in automatically re-transmitting the e-mail message to the second e-mail address without the sender's involvement.

12. The system of claim 11, wherein the first e-mail address is an invalid old address associated with a former Internet service provider (ISP) of the intended recipient and the second e-mail address is a new e-mail address associated with a new ISP of the intended recipient.

13. The system of claim 12, wherein the Internet query is generated by an Internet service provider (ISP) associated with the sender in response to receipt of a "message undeliverable" message received from the former ISP when the e-mail message was sent to the first e-mail address.

14. The system of claim 11, wherein the computer system is Internet accessible, and the query and query response are communicated via Internet messaging protocols.

15. The system of claim 11, further comprising a program module for creating a new record in the database in response to receipt of an address change request from a consumer.

16. The system of claim 15, wherein the program module for creating a new record in the database is operative for requiring predetermined authenticating information before creating a record in the database.

17. The system of claim 16, wherein the authenticating information is obtained from an Internet accessible authenticating authority.

18. The system of claim 16, wherein the authenticating information comprises a consumer authenticator.

19. The system of claim 16, wherein the authenticating information comprises a merchant authenticator.

20. The system of claim 11, wherein the records of the database store other predetermined information in association with the first e-mail address and the second e-mail address, such other information selected from the group comprising a consumer consent, consumer authentication, and merchant authentication.

21. A method for effecting delivery of an e-mail message from a sender to an intended recipient, the intended recipient being associated with a first e-mail address associated with a first Internet service provider (ISP) and a second e-mail address associated with a second ISP, comprising the computer-implemented steps of:

providing an electronic mail address management system (EAMS) database of stored records correlating the first e-mail address of the intended recipient to the second e-mail address of the intended recipient;

at the sender, creating the e-mail message using the intended recipient's first e-mail address;

communicating the e-mail message from the sender to the sender's Internet service provider (ISP) via the Internet;

at the sender's ISP, attempting to deliver the e-mail message to the intended recipient at the first e-mail address;

receiving the e-mail message at the first ISP;

determining at the first ISP that the first e-mail address is not a valid address and generating a "message undeliverable" message in response thereto;

communicating the "message undeliverable" message from the first ISP to the sender's ISP;

in response to receiving the "message undeliverable" message at the sender's ISP, generating a query based on the first e-mail address of the intended recipient;

communicating the query from the sender's ISP to the EAMS database;

in response to the receipt of the query, accessing the EAMS database to determine whether the second e-mail address of the intended recipient is stored in association with the first e-mail address;

in response to a determination that the second e-mail address of the intended recipient is stored in association with the first e-mail address, retrieving the second e-mail address from the EAMS database as a response to the query;

communicating the query response to a computer system not operated by the sender;

modifying the e-mail message to utilize the second e-mail address as the address for the e-mail message; and automatically transmitting the modified e-mail message to the intended recipient at the second e-mail address without the involvement of the sender.

22. The method of claim 21, wherein the first ISP is a former ISP associated with the intended recipient and the second ISP is the current ISP associated with the intended recipient.

23. The method of claim 21, wherein the EAMS database is Internet accessible and the query and query response are communicated via Internet messaging protocols.

24. The method of claim 21, wherein a computer system associated with the EAMS autoforwards the e-mail message to the second e-mail address in response to receipt of the query response.

25. The method of claim 21, wherein the query response containing the second e-mail address is provided by the EAMS in response to the query, and wherein a computer system associated with the sender automatically forwards the e-mail message to the second e-mail address in response to receipt of the query response.

26. The method of claim 25, wherein the sender's ISP autoforwards the e-mail message to the second e-mail address in response to receipt of the query response.

27. The method of claim 21, further comprising steps for creating a new record in the EAMS database in response to receipt of an address change request from a consumer.

28. The method of claim 27, further comprising the step of requiring predetermined authenticating information before creating a record in the database.

29. The method of claim 28, wherein the authenticating information is obtained from an Internet accessible authenticating authority.

30. The method of claim 28, wherein the authenticating information comprises a consumer authenticator.

31. The method of claim 28, wherein the authenticating information comprises a merchant authenticator.

32. The method of claim 22, wherein the EAMS database stores other predetermined information in association with the first e-mail address and the second e-mail address, such other information selected from the group comprising a consumer consent, consumer authentication, and merchant authentication.

33. The system of claim 11, wherein the process for utilization in automatically re-transmitting the e-mail message to the second e-mail address comprises a program module in said computer system.

34. The system of claim 11, wherein the process for utilization in automatically re-transmitting the e-mail message to the second e-mail address comprises a program module in a computer system associated with the sender's ISP.

35. A method for managing e-mail address changes, comprising:

providing a database of stored records in a computer system correlating a first e-mail address of an intended recipient of an e-mail message to a second e-mail address of the intended recipient;

in response to a query from a sender's Internet service provider (ISP) associated with the sender of an e-mail message based on the first e-mail address of the intended recipient, accessing the database to determine whether the second e-mail address of the intended recipient is stored in association with the first e-mail address;

in response to a determination that the second e-mail address of the intended recipient is stored in the database in association with the first e-mail address, retrieving the second e-mail address from the database as a response to the query; and communicating the query response to a process for utilization in automatically re-transmitting the e-mail message to the second e-mail address without the sender's involvement.

36. The method of claim 35, wherein the first e-mail address is an invalid old address associated with a former Internet service provider (ISP) of the intended recipient and the second e-mail address is a new e-mail address associated with a new ISP of the intended recipient.

37. The method of claim 36, wherein the query is generated by an Internet service provider (ISP) associated with the sender in response to receipt of a "message undeliverable" message received from the former ISP when the e-mail message was sent to the first e-mail address.

38. The method of claim 35, wherein the query and query response are communicated via Internet messaging protocols.

39. The method of claim 35, wherein the process for utilization in automatically re-transmitting the e-mail message to the second e-mail address comprises a program module in a computer system associated with the database.

40. The method of claim 35, wherein the process for utilization in automatically re-transmitting the e-mail message to the second e-mail address comprises a program module in a computer system associated with the sender's ISP.

41. The method of claim 35, further comprising the step of creating a new record in the database in response to receipt of an address change request from a consumer.

42. The method of claim 44, wherein the step of creating the new record in the database includes obtaining predetermined authenticating information before creating a record in the database.

43. The method of claim 42, wherein the authenticating information is obtained from an Internet accessible authenticating authority.

44. The method of claim 42, wherein the authenticating information comprises a consumer authenticator.

45. The method of claim 42, wherein the authenticating information comprises a merchant authenticator.

46. The method of claim 35, wherein the records of the database store other predetermined information in association with the first e-mail address and the second e-mail address, such other information selected from the group comprising a consumer consent, consumer authentication, and merchant authentication.

* * * * *